US008909751B2

(12) United States Patent
Fortier et al.

(10) Patent No.: US 8,909,751 B2
(45) Date of Patent: Dec. 9, 2014

(54) FLEXIBLE POLICY BASED NETWORK DECISION MAKING

(75) Inventors: Dominique Fortier, Issaquah, WA (US); Jeremiah C. Spradlin, Woodinville, WA (US); Poonam Sigroha, Bothell, WA (US); Alistair Fulton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 12/979,391

(22) Filed: Dec. 28, 2010

(65) Prior Publication Data

US 2012/0166604 A1 Jun. 28, 2012

(51) Int. Cl.
*G06F 13/00* (2006.01)
*H04L 12/24* (2006.01)

(52) U.S. Cl.
CPC ........... *H04L 41/0893* (2013.01); *Y04S 40/162* (2013.01)
USPC ....................................... 709/223

(58) Field of Classification Search
CPC ..................... H04L 41/0213; H04L 29/08072; H04L 29/06; H04L 41/22; H04L 41/12; H04L 41/0893; Y04S 40/162
USPC ....................................... 709/223
See application file for complete search history.

(56) References Cited

U.S. PATENT DOCUMENTS

| 6,539,425 B1 | 3/2003 | Stevens et al. |
| 7,653,392 B2 | 1/2010 | Ovadia et al. |
| 2004/0267865 A1 * | 12/2004 | Cuervo .......................... 709/200 |
| 2005/0091357 A1 | 4/2005 | Krantz et al. |
| 2006/0274774 A1 | 12/2006 | Srinivasan et al. |
| 2008/0298252 A1 | 12/2008 | Yonge, III et al. |
| 2010/0177711 A1 | 7/2010 | Gum |
| 2010/0188975 A1 | 7/2010 | Raleigh |

FOREIGN PATENT DOCUMENTS

| CN | 1726674 A | 1/2006 |
| CN | 1860467 A | 11/2006 |
| KR | 1020040092286 A | 11/2004 |
| KR | 1020090012022 A | 2/2009 |
| KR | 1020090059669 A1 | 6/2009 |
| WO | 2004/031488 A1 | 4/2004 |

OTHER PUBLICATIONS

"International Search Report", Mailed Date: Apr. 30, 2012, Application No. PCT/US2011/067310, Filed Date: Dec. 24, 2011, pp. 8.

(Continued)

*Primary Examiner* — Robert B Harrell
(74) *Attorney, Agent, or Firm* — Ben Tabor; Kate Drakos; Micky Minhas

(57) ABSTRACT

A network policy system is described herein that allows computing devices to manage and control various networking decisions based on a specific policy defined by a policy administrator that may include the device manufacturer, information technology (IT) personnel maintaining the devices, or the network provider. The policies can include many factors defined by the policy administrator under various conditions, including cost, power consumption, central processing unit (CPU) time, battery life, use of pooled minutes, and so forth. Packet routing in the device happens today primarily based on hardcoded factors such as bandwidth availability or cost, but there may be other considerations that appeal to policy administrators. The network policy system allows the policy administrator to define one or more flexible policies suited to the administrator's purpose.

16 Claims, 6 Drawing Sheets

(56) References Cited

OTHER PUBLICATIONS

Phifer, Lisa, "How to create persistent, secure connections for roaming WiMAX, 3G and 802.11x", Retreived at << http://searchnetworking.techtarget.com.au/articles/30187-How-to-create-persistent-secure-connections-for-roaming-WiMAX-3G-and-8-2-11x >>, Mar. 20, 2009, pp. 4.

Sun, et al., "Towards connectivity management adaptability: context awareness in policy representation and end-to-end evaluation algorithm", Retrieved at << http://citeseerx.ist.psu.edu/viewdoc/download?doi=10.1.1.115.6630&rep=rep1&type=pdf >>, Oct. 27-29, 2004, pp. 8.

Yang et al., "Policy-driven mobile agents for context-aware service in next generation networks", Retrieved at << http://citeseerx.ist.psu.edu/viewdoc/download?doi=10.1.1.101.7092&rep=rep1&type=pdf >>, In MATA 2003, 5th International Workshop on Mobile Agents for Telecommunication Applications, vol. 2881, Oct. 8, 2003, pp. 10.

"Network Policy manager", Retrieved at << http://mobilebusiness.bell.ca/wireless-solutions/your-business-needs/it-service-management/network-policy-manager >>, Retrieved Date: Oct. 27, 2010, pp. 1.

"First Office Action and Search Report Issued in Chinese Patent Application No. 201110445919.8", Mailed Date: Jan. 24, 2014, Filed Date: Dec. 27, 2011, 20 Pages.

"Second Office Action Issued in Chinese Patent Application No. 201110445919.8", Mailed Date: Jul. 1, 2014, Filed Date: Dec. 27, 2011, 16 Pages.

* cited by examiner

FLEXIBLE POLICY BASED NETWORK DECISION MAKING

BACKGROUND

Mobile and other computing devices often contain multiple network transports that can be used to connect to other computing devices and access services. For example, a mobile smartphone may include hardware for connecting to cellular data networks (e.g., 3G, EDGE, 4G), wireless networks (e.g., 802.11 Wi-Fi), and Bluetooth networks. Each network has advantages and disadvantages. For example, one network may offer higher throughput than other networks but may be available in fewer locations. Some networks may incur a higher cost for use, such as a limited 3G data plan versus free Wi-Fi. In some cases, particular network hardware may have higher power usage requirements and thus may exhibit longer or shorter battery life for the computing device.

Routing decisions determine which network is used to service a request from an application to send messages or other traffic over a network. Mobile devices often hard code the routing decision, so that, for example, the device prefers to use a Wi-Fi connection, and if no Wi-Fi connection is available uses a 3G connection, and if no 3G connection is available uses an EDGE connection. In this scheme, the device selects the fastest available connection irrespective of other considerations. Networked devices make many other types of decisions related to the network, such as what types of messages to send, under what conditions to use various network transports, how much power to use to transmit, and so forth.

There may be many other considerations besides bandwidth availability that informs a device's networking decisions, but today users are stuck with the choices that their communication service provider (e.g., cellular carrier, etc.)or device maker programmed into their device. Users may manually turn off Wi-Fi or other network transports to force a connection to one network type or another, but this process is tedious and involves digging through often-obscure settings interfaces to find the right configuration parameter to tweak. If a carrier has defined cost as the overriding concern of a routing decision, then other considerations are ignored and the user may appreciate the low monthly bill but wish for faster throughput in some cases. Conversely, if the carrier has defined throughput as the overriding concern then cost may be ignored. For corporate users of such devices, other policies may be desirable for devices issued to employees but there is no mechanism for controlling and enforcing the use of such policies.

Finally, there are considerations for devices that have no users to guide their behavior. These devices are generally specialized in nature and relatively fixed in function, in that they perform the same function throughout the lifetime of the device. For these specialized devices, their usage of the network is entirely dependent on the choices the device manufacturer made in regards to choosing a network, and the actual usage of the network connection is dependent upon how the applications that run on the device choose to use the network. For the owner of these devices, it can be difficult to alter these characteristics once the device has been shipped and configured.

SUMMARY

A network policy system is described herein that allows computing devices to manage and control various networking decisions based on a specific policy defined by a policy administrator that may include the device manufacturer, information technology (IT) personnel maintaining the devices, or the network provider. The policies can include many factors defined by the policy administrator under various conditions, including cost, power consumption, central processing unit (CPU) time, battery life, use of pooled minutes, and so forth. The processing of specific data packets may or may not be part of policy definition. Packet routing in the device happens today primarily based on hardcoded factors such as bandwidth availability or cost, but there may be other considerations that appeal to device users, carriers, or other policy administrators. The network policy system allows the policy administrator to define one or more flexible network policies suited to the administrator's purpose. Thus, policy definition and application is a way of making the devices smart enough to be able to decide via preset policies when and how to start sending data packets to selected endpoints via a selected network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
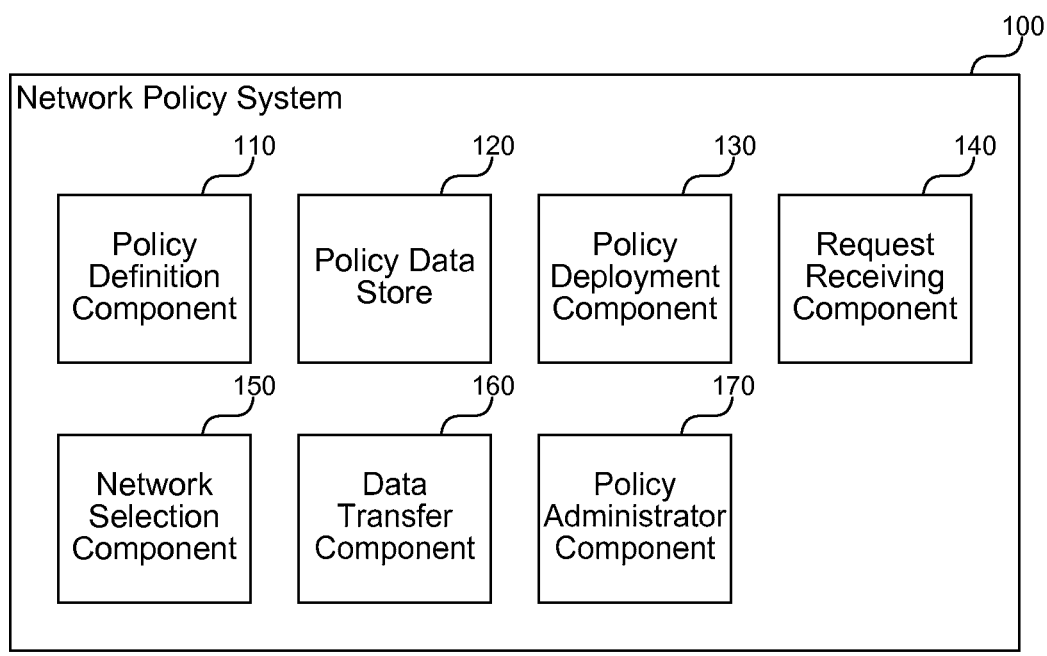
FIG. 1 is a block diagram that illustrates components of the network policy system, in one embodiment.

A network policy system is described herein that allows computing devices to manage and control various network decisions based on a specific policy defined by a policy administrator that may include the device manufacturer, information technology (IT) personnel maintaining the devices, end-user, or the network provider. The policies can include many factors defined by the policy administrator under various conditions, including cost, power consumption, central processing unit (CPU) time, battery life, use of pooled minutes, cost of per-minute usage, cost of bandwidth consumption, current network utilization and so forth. The type, origination, content, and protocol of the data packets may or may not be part of policy definition. For example, an automatic emergency defibrillator (AED) device may have several applications that monitor the device and report up regularly; however, when the device is operating from a cellular connection, the policy only allows emergency low battery notifications to be transmitted to a specific endpoint. This is an example of a policy that includes definition for data packets, network, and endpoints. In another example, only the data packet (message) and the network are defined, and the message is a broadcast on the network without a specific endpoint. This can be useful for private networks or for using network resources when the network resources are cheaper. Packet routing in the device (different transports such as Wi-Fi versus cellular) happens today primarily based on hardcoded factors such as bandwidth availability or cost, but there may be other considerations that appeal to device users, carriers, or other policy administrators. In the case of low battery power left on the device, switching over to a low battery cost transport is the right decision versus price. The device may need to complete productive work using the last bit of battery power left.

The network policy system allows the policy administrator to define one or more flexible network policies suited to the administrator's purpose. A policy can be as simple as allowing an SOS message for a vending machine going out of supplies, to as complicated as a decision tree to identify which network to use based on a number of factors like time of day, priority of the message, cost for the network provider, content of the message, security of the network or transmission protocol, latency of the network, processing time, reliability of the protocol, and so on. A policy can be defined to use multiple networks based on a selection function. The system can also allow a network transport that is in use to have the ability to be interrupted, e.g., to send critical messages that can have high business impact as high priority. These messages could have a different cost structure and can leverage multiple networks. In addition, the policy might specify the way in which to utilize the chosen network. For example, the policy may specify MTU (minimum transmission unit) size, retry counts, and TTL (time to live). The policy might even specify that usage of a certain network is only allowed when the network utilization is at less than a particular (e.g., 50%) capacity. Thus, policy definition and application is a way of making the devices smart enough to be able to decide via preset policies when and how to start sending data packets to selected endpoints via a selected network.

FIG. 1 is a block diagram that illustrates components of the network policy system, in one embodiment. The system 100 includes a policy definition component 110, a policy data store 120, a policy deployment component 130, a request receiving component 140, a network selection component 150, a data transfer component 160, and a policy administrator component 170. Each of these components is described in further detail herein.

The policy definition component 110 receives one or more policy definitions from a policy administrator. The component 110 may provide a user interface or programmatic application programming interface (API) through which IT personnel, end-users, communication service providers, device makers, or other policy administrators can create policies for controlling network-related decisions on one or more computing devices. The policy definition component 110 exposes various policy rules from which to choose, including selecting networks, endpoints, and messages to be sent under various conditions, as well as criteria to be used for selecting, such as cost, battery power, throughput, and so forth. The policy definition component 110 stores received policies in the policy data store 120.

The policy data store 120 stores defined routing policies persistently for access during network decisions. The policy data store 120 may include one or more in-memory data structures, files, file systems, hard drives, external storage devices, databases, cloud-based storage services, or other storage facilities that persistently store data for later use. The policy data store 120 receives new policies from the policy definition component 110 and may be accessed by the policy deployment component 130 to deploy the policy or policies to one or more computing devices (e.g., smart phones, laptop computers, tablet computers, etc.). For example, a company may provide policies for devices managed throughout the enterprise that balance organizational priorities, such as cost control, battery life, and so forth. The network selection component 150 accesses the policy data store 120 or deployed policies from the store 120 during network decisions to enforce the defined criteria of the policies.

The policy deployment component 130 deploys one or more policies to one or more computing devices so that the computing devices can consult the policies as network-related decisions are made. A network-related decision may occur each time an application requests to send a message or other packet over a network from a computing device. Alternatively or additionally, a policy may apply per connection, per time period, and so forth. The policy deployment component 130 may copy policies from a centrally accessible server to one or more devices. In some embodiments, the devices periodically query the policy server for new policies (i.e., pull technology). Alternatively or additionally, the policy deployment component 130 may use push technology to push the policies out to devices. "Push" technology initiates a communication session from a network element, such as a server, rather than from the end-user device (e.g., smart phone). In other embodiments, the system 100 may not provide a deployment mechanism, allowing carriers or others to decide how to handle policy distribution.

The request receiving component 140 receives a request to transfer data from an application running on a computing device that has multiple network transports to send network data to an endpoint. The application may include user-mode applications such as an email program or web browser, as well as operating system services such as a synchronization service. The request receiving component 140 intercepts the request and uses the network selection component 150 to select an appropriate network over which to transmit the request. In some cases, requests may arrive with specific information about a network to use, but in other cases, the application expects system software associated with the computing device to select an appropriate network.

The network selection component 150 consults a policy that specifies conditions for selecting one among multiple available networks based on at least one selection criteria. The selection criteria may take into account a number of factors including battery consumption of each network, subscription cost of using a network, queued data waiting for each network, or any other factor that a policy administrator defines. It is also possible for the component 150 to select among a population of one network, such that the decision is whether any transmission is allowed over the network. The network selection component 150 may determine a number of environmental factors used by the policy, including the current battery remaining, current processor usage, available networks, queued network traffic, and so forth. The system compares these environmental factors to rules in the policy to select an appropriate network or other parameters that satisfies the policy constraints. For example, if the policy specifies that below 10% battery life the component 150 selects the lowest power network device, the component 150 may access historical or predefined battery usage information for each device and select the one that will allow the remaining battery life to last as long as possible.

The data transfer component 160 completes the requested data transfer using a network or other conditions selected by the network selection component 150. In some embodiments, the policy may also define/override the endpoint. For example, a vending machine may include an embedded computing device and may send a low priority message if the vending machine needs to be restocked, but a more urgent, high priority message if the vending machine is being stolen. The policy in such cases may determine the network transport used and the endpoint(s) to receive the message. The data transfer component 160 may include a network stack of the mobile device that provides common Internet or other protocols for sending and receiving data.

The policy administrator component 170 receives one or more policies from one or more policy sources, and determines which policy elements to apply. For example, a particular device may receive policies from an enterprise associated with the device, a service provider (e.g., a cellular carrier), a device maker, and a user of the device. Each of these policies may have differing priority and may include conflicting policy elements. For example, a service provider may prefer a different network selection than a particular enterprise. The policy administrator component 170 is tasked with resolving policy conflicts and applying policies in accordance with policy priorities defined by a particular implementation of the system 100. The priorities may be implemented in various ways. For example, in one implementation the policies may have hierarchical priority, so that settings for policy elements at the enterprise level override those at the user level, and so forth. As another example, an implementation may treat an effective policy as the union of all received policy elements, so that the effective policy is the most restrictive of the settings provided. Those of ordinary skill in the art will recognize these and other variations for selecting among competing and conflicting priorities from various sources. Example sources of policies are illustrated further with reference to FIG. 5.

The computing device on which the network policy system is implemented may include a central processing unit, memory, input devices (e.g., keyboard, touchscreen, and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
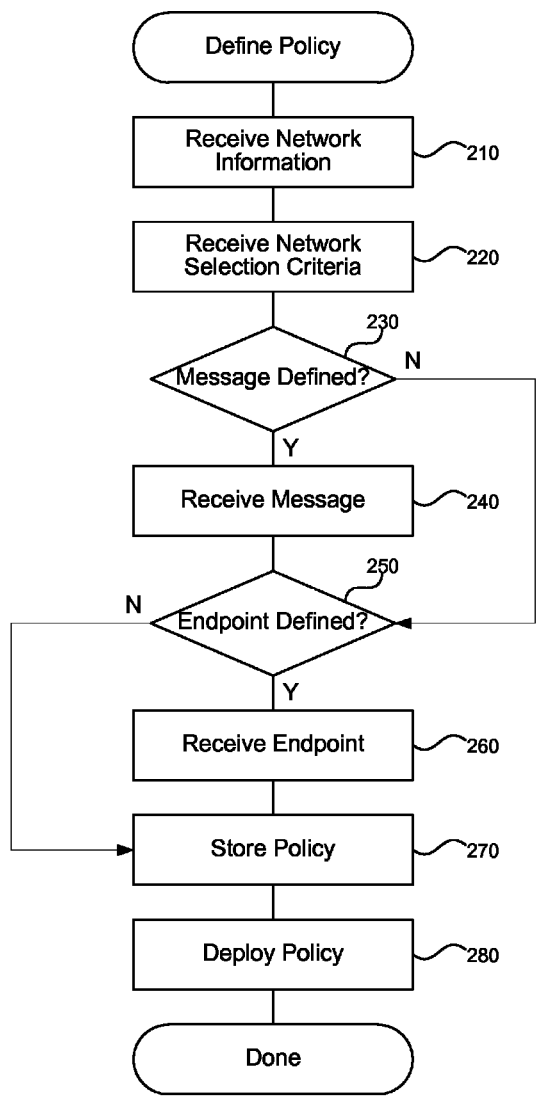
FIG. 2 is a flow diagram that illustrates processing of the network policy system to define a flexible routing policy for directing network traffic of a computing device, in one embodiment.

FIG. 2 is a flow diagram that illustrates processing of the network policy system 100 to define a flexible policy for directing network traffic of a computing device, in one embodiment. Beginning in block 210, the system receives information describing one or more available networks over which the computing device can send communications. For a mobile device such as a mobile phone, the networks may include a 3G cellular data network and a wireless 802.11 network. For an embedded entertainment device in a home, the networks may include a wireless 802.11 network, a wired Ethernet network, and a Worldwide Interoperability for Microwave Access (WiMAX, aka 802.16) network. The system receives information about each network and the hardware available for connecting to each network. In some cases, the system may receive information about characteristics of the hardware, such as battery consumption, available power levels, usage cost, and so forth.

Continuing in block 220, the system receives one or more network selection criteria from a policy administrator that define conditions for selecting a particular network from the received networks. The network selection criteria can be tailored by the policy administrator to meet any organizational or other goals, such as keeping devices with low battery in touch with a network, managing subscription cost of various data plans, reducing radiation from a mobile device, using the most secure communication link available, and so forth. The selection criteria may include one or more rules that apply under different conditions. For example, one policy may apply to devices with less than 10% of battery left while another policy may apply to a device in a remote location.

Continuing in decision block 230, if the policy administrator provides a message to be sent by a particular policy, then the system continues at block 240, else the system jumps to block 250. For example, a policy administrator may provide a message to be sent under some conditions, such as an embedded device being moved or stolen. The message may override any message the device attempts to send or may replace the message and endpoint as described further herein.

Continuing in block 240, the system receives the message to be sent by the particular policy. The message may include text, binary data, or other types of data (e.g., file data) for submission to a designated endpoint over a selected network. For example, a policy administrator may want a message to be sent to an IT monitoring facility if a mobile device is being used from an unknown network, and can define this as a policy that is deployed to the device.

Continuing in decision block 250, if the policy administrator indicates an endpoint to which to send messages for the policy, then the system continues at block 260, else the system jumps to block 270. In some cases, a network request may specify a particular endpoint or request a broadcast to all nearby endpoints on the same subnet. In other cases, the network request may expect the policy to override the endpoint to specify a recipient defined by the routing policy. For example, an embedded device may include a facility for sending a low supplies message when a vending machine is running low on supplies. The policy administrator can determine where the message is sent by providing a policy that overrides the endpoint for such messages and directs the messages to a particular organization responsible for resupplying that device.

Continuing in block 260, the system receives an endpoint to which to deliver messages for the policy. The endpoint may specify a specific endpoint (e.g., by Internet Protocol (IP) address) or may provide a redirectable endpoint, such as a Domain Name System (DNS) name that is resolved at message sending time. A policy may include some conditions that specify endpoints and others that do not. For example, the system likely would not want to interfere with endpoints for normal application activity (e.g., web browsing) on a device, but may want to intercept system messages that indicate device problems. On the other hand, the system can use endpoint overrides to block or redirect some requests, such as requests to access web pages that the policy administrator wants to control or forbid.

Continuing in block 270, the system stores the defined policy including any received selection criteria, message, and endpoint in a data store for deployment and use by computing devices. The system may store policies in a central data store accessible by the policy administrator and distributed computing devices or any other data store. The data store may include a facility maintained by an enterprise, a carrier, a device manufacturer, or other policy administrator. The policy administrator may edit and update the stored policy over time to reflect changing policy priorities or discovered best practices.

Continuing in block 280, the system deploys the defined policy to one or more computing devices. The system may push the policy to the devices, the devices may periodically request new policy data from a central policy store, or a carrier or other administrator may use an independent deployment mechanism. Each computing device receives the policy, stores the policy locally on the device, and then uses the policy as network decisions are made to carry out the policy's goals and specified criteria. Unlike previous systems, the policy is flexible in that it can be updated frequently and can include a number of conditions that are not available today. The network policy system puts policy routing control in the hands of policy administrators rather than hard coding policy decisions in device firmware or other inaccessible configuration location. After block 280, these steps conclude.

Figure 3:
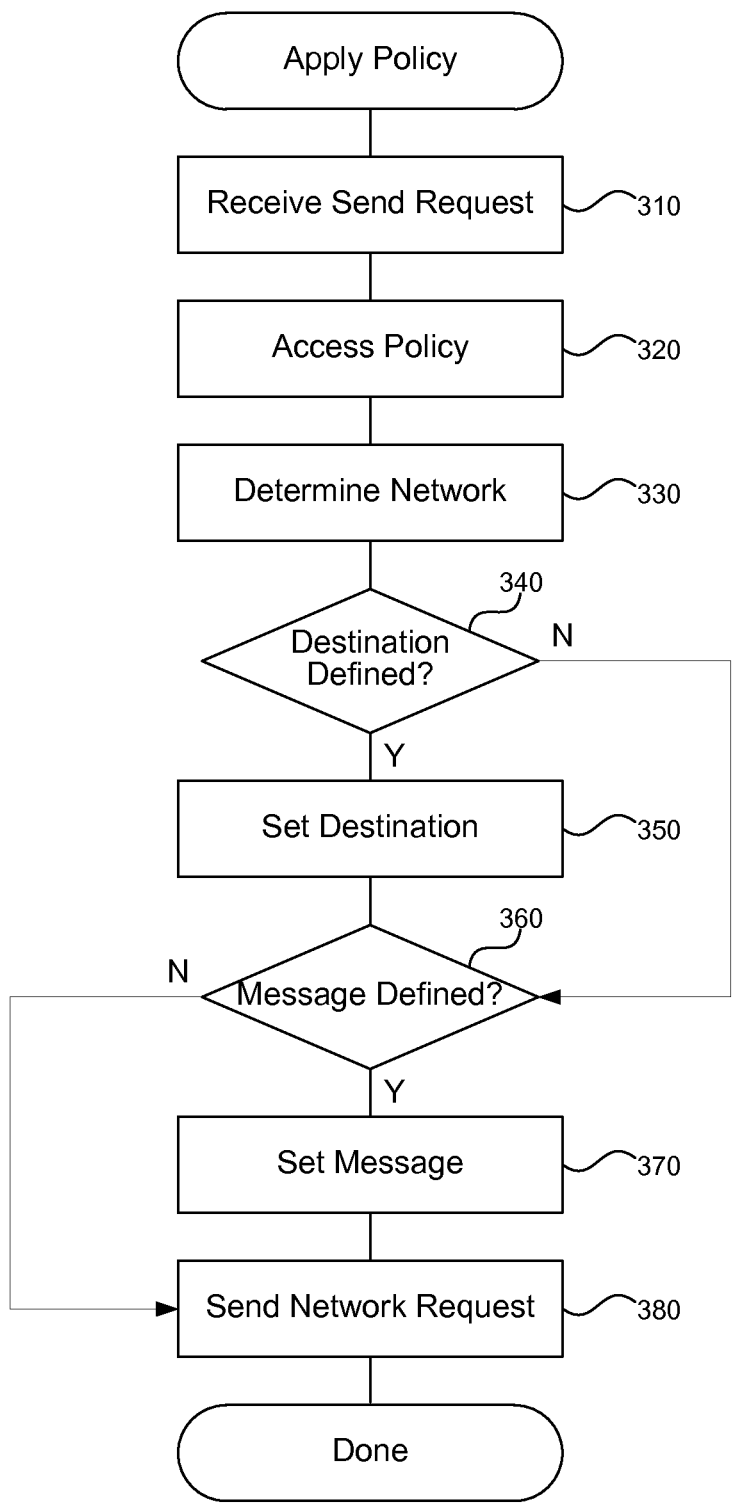
FIG. 3 is a flow diagram that illustrates processing of the network policy system to enforce a previously deployed network routing policy installed on a computing device, in one embodiment.

FIG. 3 is a flow diagram that illustrates processing of the network policy system 100 to enforce a previously deployed policy installed on a computing device, in one embodiment. Beginning in block 310, the system receives a request to send a network message from the computing device to another endpoint. The message may include an application message to perform an application-specific task, a system message related to maintenance or normal operation of the device, warning notifications about unexpected conditions for the device, and so forth. The system 100 receives a request to transmit the message and applies any defined policy to determine how the device will handle the message. In some embodiments, the system may receive a hint with the request that indicates whether the message is high priority, low priority, has high bandwidth needs, and so forth. For legacy applications that do not provide hints, the system can allow a file or other metadata to be provided that specifies the hints (e.g., an extensible markup language file (XML) placed alongside the application executable file).

Continuing in block 320, the system accesses the deployed policy to determine whether any policy conditions are satisfied that affect handling of the received request. The system may read the policy from a policy data store local to the computing device and load the policy into a policy enforcement engine that selects the appropriate network and other parameters to use for sending the message. The policy may affect routing, data content, data priority, protocol, destination, or other network-related factors of the communication. Although the following steps illustrate several types of conditions and decisions that can be determined and affected by policies, the system provides a flexible framework through which hardware or operating system makers can expose (and carriers or other policy administrators can select) a wide variety of network-related decisions based on a variety of conditions.

Continuing in block 330, the system determines a network to select among multiple available networks accessible to the device, wherein the selected network satisfies at least one policy condition defined by the policy. The computing device may have access to multiple networks or connections to the same network, such as a wired Ethernet connection, a wireless 802.11 connection, a cellular data network connection, and a WiMAX connection. The system may select the network based on a variety of conditions specified by the policy, such as the speed of the network, the cost of the network, the power consumed by the network, and so forth. The policy may change frequently such that the network selected for a particular message today may differ from that selected tomorrow. In this way, a carrier could implement a different policy for mobile device network traffic on the weekend versus weekdays or at different times of day.

Continuing in decision block 340, if the policy defines a destination to which to send the message, then the system continues at block 350, else the system jumps to block 360. The policy may define a destination for some messages that overrides any destination specified in the message itself or the received request. For example, a carrier or enterprise may want to intercept certain types of messages or messages to certain destinations and redirect those messages to a destination of the carrier's choosing. This can be used to filter harmful sites, restrict unauthorized use of enterprise devices, monitor access of sensitive information, and so forth.

Continuing in block 350, the system sets the destination of the message to the destination defined in the policy. The destination defined in the policy may include an address, DNS name, uniform resource locator (URL), or other specification that the system can resolve during sending to a particular network address to which to send the message. The system overrides any destination specified in the message and provides the new endpoint to the transport layer for sending the message. For example, the system may override a transmission control protocol (TCP) or other address.

Continuing in decision block 360, if the policy defines a message to override the received message, then the system continues at block 370, else the system jumps to block 380. The policy may override the message to provide a notification to a predetermined destination specified in the policy or to update the message contents to perform a different task defined by the policy administrator. The ability to override and rewrite messages makes the system very flexible to carry out a variety of policy administrator goals.

Continuing in block 370, the system sets the message content of the message to that defined in the policy. For example, the system may update a message to request data from a new location or to send an urgent warning message in response to a device being used in an unexpected or unauthorized way. In other cases, the message may be overwritten to connect through a particular data channel and to provide credentials without exposing the credentials to the user (e.g., a carrier-managed wireless access protocol (WAP) network).

Continuing in block 380, the system sends the received network message with any modifications enforced by the accessed policy. The system sends the message over the network selected by the policy and using any modifications to the destination, message, or other factors. The system may send the message as originally requested or with various modifications. By sending the message in accordance with the policy, the system enforces the policy administrator's goals defined in the policy, and may save/reduce battery usage, bandwidth, radiation, or other potential costs of sending the message. After block 380, these steps conclude.

Figure 4:
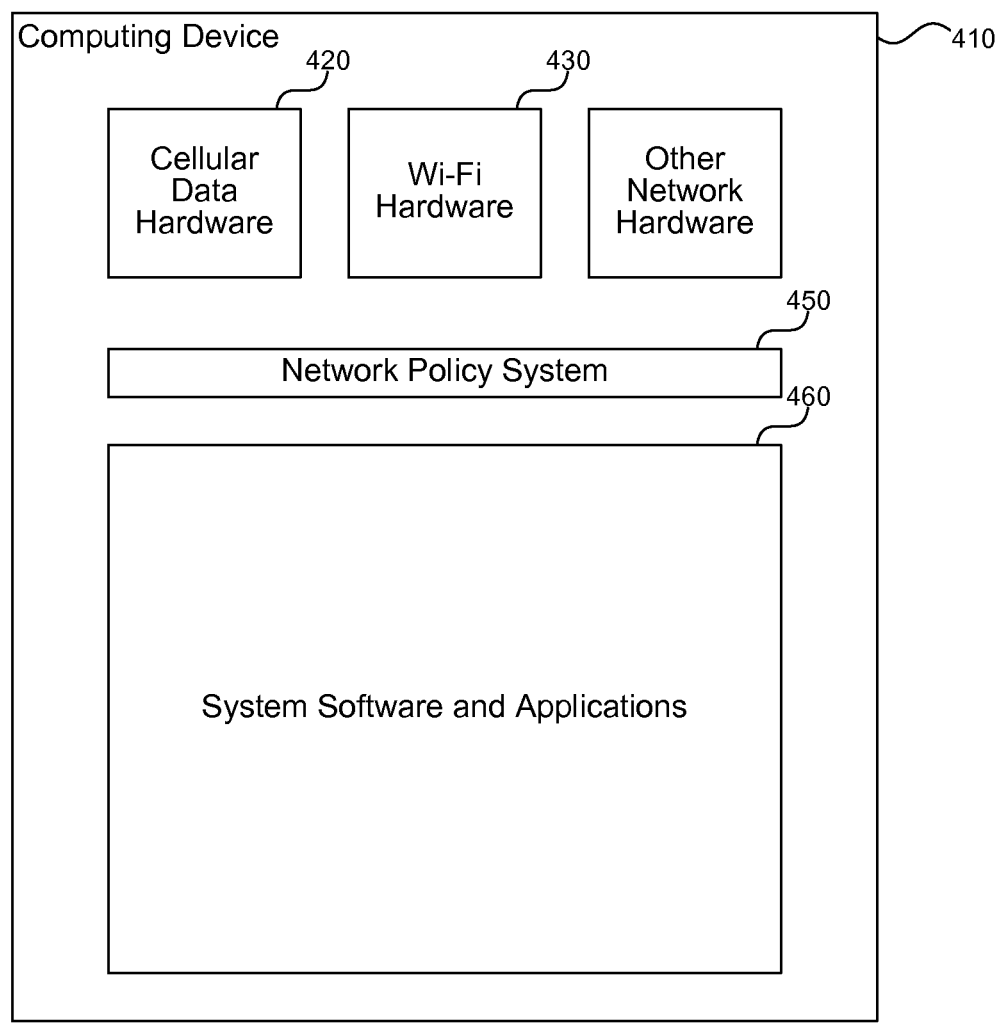
FIG. 4 is a block diagram that illustrates an exemplary computing device using the network policy system, in one embodiment.

FIG. 4 is a block diagram that illustrates an example computing device using the network policy system, in one embodiment. The device 410 can include a variety of computing devices, such as a mobile phone, embedded consumer device (e.g., game console, cable set-top box), laptop computer, and so forth. The device 410 includes hardware for connecting to multiple networks, such as cellular data hardware 420 for connecting to a cellular data network and Wi-Fi hardware 430 for connecting to a wireless network. System software and applications 460 send data over the available hardware, but often do not have a preference for which network hardware is used. In some cases, the system software and applications 460 may have general preferences, such as high bandwidth or low power, but no direct correlation between these hints and available network resources. The network policy system 450 sits between the applications 460 and network hardware (or may be incorporated into the system software), and makes networking decisions based on various priorities defined in a received policy, as well as potentially based on any application-provided hints specifying the application's needs.

Figure 5:
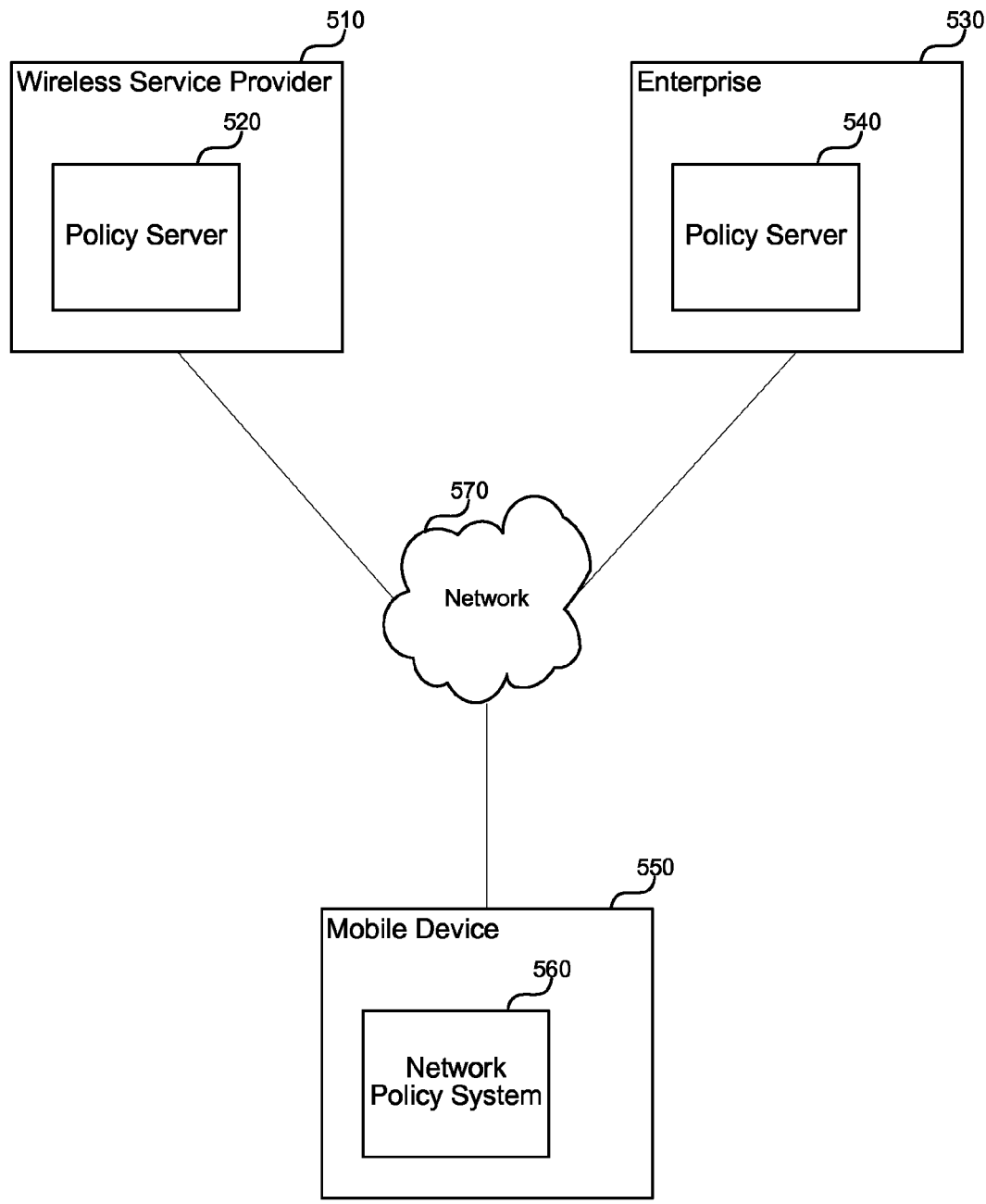
FIG. 5 is a block diagram that illustrates potential sources from which the network policy system may receive policies, in one embodiment.

FIG. 5 is a block diagram that illustrates potential sources from which the network policy system may receive policies, in one embodiment. The diagram includes a wireless service provider 510, an enterprise 530, and a mobile device 550 connected by a network 570. The wireless service provider 510 includes a policy server 520 that provides one or more polices for distributed devices that connect to the wireless service provider 510. The enterprise 530 also includes a policy server 540 that provides one or more policies for distributed devices associated with the enterprise 530. The policies provides by the wireless server provider 510 and enterprise 530 potentially either complement each other or overlap creating one or more conflicts in policy. The mobile device 550 includes an implementation of the system 560 described herein. The system 560 includes a policy administrator that receives policy from the various policy sources and resolves conflicts in accordance with a hierarchical or other conflict resolution model to determine an effective policy that the system 560 will apply to network traffic associated with the mobile device 550.

Figure 6:
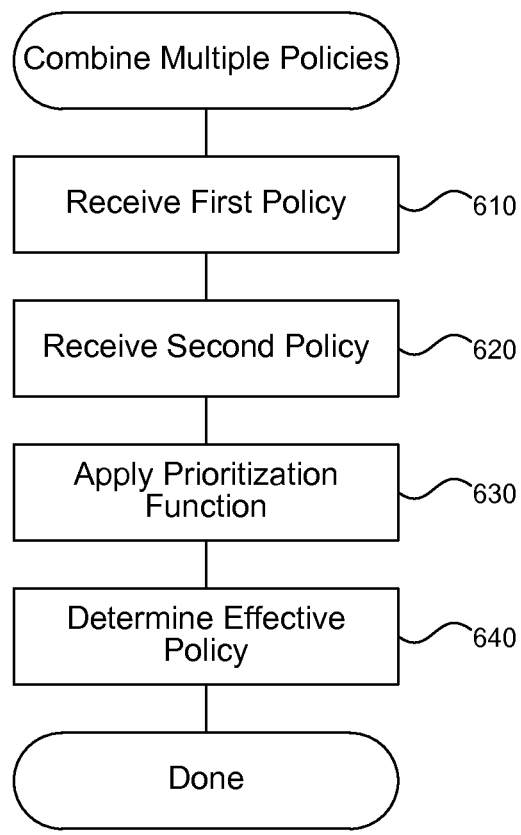
FIG. 6 is a flow diagram that illustrates combination and resolution of conflicts between multiple received network policies, in one embodiment.

FIG. 6 is a flow diagram that illustrates combination and resolution of conflicts between multiple received network policies, in one embodiment. Beginning in block 610, the system receives a first policy from a first policy source, wherein the policy specifies one or more policy elements that affect treatment of network communications from a device. For example, a policy element may specify network settings, such as MTU, network selection, and so forth. The policy source may include an enterprise, device maker, service provider, or user settings on the device itself.

Continuing in block 620, the system receives a second policy from a second policy source. The second policy also includes policy elements that affect treatment of network communications from the device. For example, the first policy may originate from an enterprise associated with the device, and the second policy may originate from a service provider associated with the device. In a simple case, the two policies contain complementary settings that the system policy administrator can apply without conflicts. In more complex cases, the policies provide settings that contain one or more direct or implied conflicts that the system resolves. Although receipt of two policies is shown, the system may receive policies from a greater number of policy sources and apply the steps described to determine an effective policy.

Continuing in block 630, the system applies a prioritization function to determine a relative priority between the two received policies. The prioritization function may include one or more fixed criteria, such as a predefined hierarchy between types of policy sources, or dynamic criteria, such as various combinations of the policies and respecting received priority indications. In the case of a predetermined hierarchy, the system may apply a function that applies the lowest priority policy first on up to the highest priority policy, so that higher priority policies override settings made by lower priority policies. For example, if both the enterprise and service provider set the MTU size to use for transmissions, and the enterprise is above the service provider in the hierarchy, then the enterprise's setting for this policy element will win and be present in the effective policy. In the case of dynamic criteria, the policies themselves may include an indication of priority as a whole or by individual priority elements or groups of elements. For example, the service provider may have highest priority to make settings that affect the service provider's network, but the enterprise may have highest priority to make settings that affect the enterprise.

Continuing in block 640, the system determines an effective policy based on the determined relative priority between policies. The effective policy represents the result of any conflict resolution and combination of the policies to create a unified policy to apply to network communications associated with the device. The effective policy may include a union of settings provided by each policy, or a selection of one policy's settings in the case of a conflict. The system applies the effective policy to future network communications to and from the device. After block 640, these steps conclude.

In some embodiments, the network policy system allows a carrier to create a subscription based on policy. For example, a carrier can offer a low cost plan contingent upon a mobile device user allowing the carrier to determine the method of connection to the available networks. To keep cost low, the carrier may prefer Wi-Fi when available, limit bandwidth usage during peak hours, or other policies that allow the carrier to serve more users. In return, the carrier passes savings along to the user.

In some embodiments, the network policy system receives an application characterization of network traffic sent by the application that forms a hint for selecting an available network based on the routing policy. For example, an application may indicate a priority level of network traffic, a deadline for sending the network traffic, or other constraints that allow the system flexibility in selecting a network for sending the traffic. For example, the system may choose to delay lower priority traffic or to use lower powered network devices for sending that traffic, while reserving higher-powered network devices for high priority traffic.

In some embodiments, the network policy system operates with advertising or other systems to accumulate credit that affects a network policy. For example, a carrier may offer a free cellular data plan if the user agrees to watch a certain number of advertisements. The system may select which network connection to use or how much bandwidth is available based on an amount of credit earned by the user for completing other tasks. The flexibility of the network policy system allows these and other cost structures to be created and reliably enforced to open up new possibilities for carriers and computing device makers to sell their devices and network usage.

In some embodiments, the network policy system selects levels of use of a single network in addition to selecting between multiple networks. For example, some carriers prefer that a computing device use the network quickly even if the use is high bandwidth and then stop using the network to free up available frequency spectrum. Thus, a policy may allow a high bandwidth use of a network for some short period (e.g., 30 seconds) under the assumption that most requests can complete in that time, while longer tasks may then be throttled by the policy to a lower amount of bandwidth. As another example, a network device may include multiple power levels, some of which cannot transmit as fast but use less battery power. The policy administrator may restrict use of the highest power levels while allowing more sustained use of lower power levels to prolong battery life. These and other restrictions of use of a single network can be defined within a policy.

From the foregoing, it will be appreciated that specific embodiments of the network policy system have been described herein for purposes of illustration, but that various modifications may be made without deviating from the spirit and scope of the invention. Accordingly, the invention is not limited except as by the appended claims.

We claim:

1. A computer-implemented method for defining a flexible policy for controlling network traffic of a computing device, the method comprising:
   receiving information describing one or more network settings that determine how the computing device can send communications over one or more networks;
   receiving one or more policy elements from a policy administrator that define values for one or more particular network settings;
   if the policy administrator indicates a destination to which to send messages for the policy, receiving a destination to which to deliver messages for the policy;
   storing a policy, defined at least in part by any received policy elements and destination, in a data store for deployment and use by the computing device; and
   deploying the defined policy to one or more computing devices, wherein the preceding steps are performed by at least one processor.

2. The method of claim 1 wherein receiving network settings information comprises on a mobile phone, identifying at least a cellular data network and a wireless Wi-Fi network.

3. The method of claim 1 wherein receiving network settings information comprises receiving information describing characteristics of available network hardware.

4. The method of claim 1 wherein receiving one or more policy elements comprises receiving values that reduce power usage by selecting a network with lower power usage if it is available.

5. The method of claim 1 wherein receiving one or more policy elements comprises receiving one or more rules that apply under different conditions of the computing device.

6. The method of claim 1 wherein receiving the destination comprises receiving an indication to broadcast the message over the selected network identified by the network selection criteria.

7. The method of claim 1 wherein receiving the destination comprises overriding a destination specified by the computing device to specify a recipient defined by the policy.

8. The method of claim 1 wherein receiving the destination comprises defining a policy that overrides the destination under some conditions and does not override the destination under other conditions, wherein at least one condition is the battery level of the computing device.

9. The method of claim 1 wherein storing the defined policy comprises storing the policy in a central data store accessible by the policy administrator and distributed computing devices.

10. The method of claim 1 wherein deploying the defined policy comprises pushing the policy to the computing device from a central policy store so that the computing device receives the policy, stores the policy locally on the device, and then uses the policy as network decisions are made to carry out the policy's specified criteria.

11. A computer system for defining flexible policies for controlling and managing network decisions, the system comprising:
   a processor and memory configured to execute software instructions embodied within the following components;
   a policy definition component that receives one or more policy definitions from a policy administrator;
   a policy data store that stores defined policies persistently for access during network decisions at a computing device;
   a policy deployment component that deploys one or more policies to one or more computing devices so that the computing devices can consult the policies as routing decisions are made;
   a request receiving component that receives a request to transfer data from an application running on a computing device that has at least one network transport over which to send network data to a destination;
   a network selection component that consults a deployed policy that specifies conditions for selecting one network from a plurality of available networks based on at least one selection criteria;
   a data transfer component that completes the requested data transfer using the selected network selected by the network selection component; and
   a policy administrator component that receives one or more policies from one or more policy sources, and determines which policy elements to apply.

12. The system of claim 11 wherein the policy definition component provides a user interface for the policy administrator to define policies and stores created policies in the policy data store for deployment to at least one computing device.

13. The system of claim 11 wherein the policy data store receives new policies from the policy definition component and can be accessed by the policy deployment component to deploy the policy or policies to one or more computing devices.

14. The system of claim 11 wherein the network selection component is invoked in response to a routing decision that occurs as an application requests to send a message or other packet over a network from a computing device.

15. The system of claim 11 wherein the request receiving component intercepts the request and invokes the network selection component to select an appropriate network over which to transmit the request based on a deployed, updatable routing policy.

16. The system of claim 11 wherein the network selection component determines one or more environmental factors of the computing device and used by the policy, and compares the determined environmental factors to rules in the policy to select an appropriate network from the plurality of available networks that satisfy the policy.

* * * * *